June 29, 1965 W. H. KAGLEY 3,191,894
MOUNTING DEVICE FOR VIBRATOR FEEDING MECHANISM
Filed June 8, 1962 3 Sheets-Sheet 1

INVENTOR.
WILLIAM HERBERT KAGLEY
BY
Huebner & Worrel
ATTORNEYS.

June 29, 1965 W. H. KAGLEY 3,191,894
MOUNTING DEVICE FOR VIBRATOR FEEDING MECHANISM
Filed June 8, 1962 3 Sheets-Sheet 2
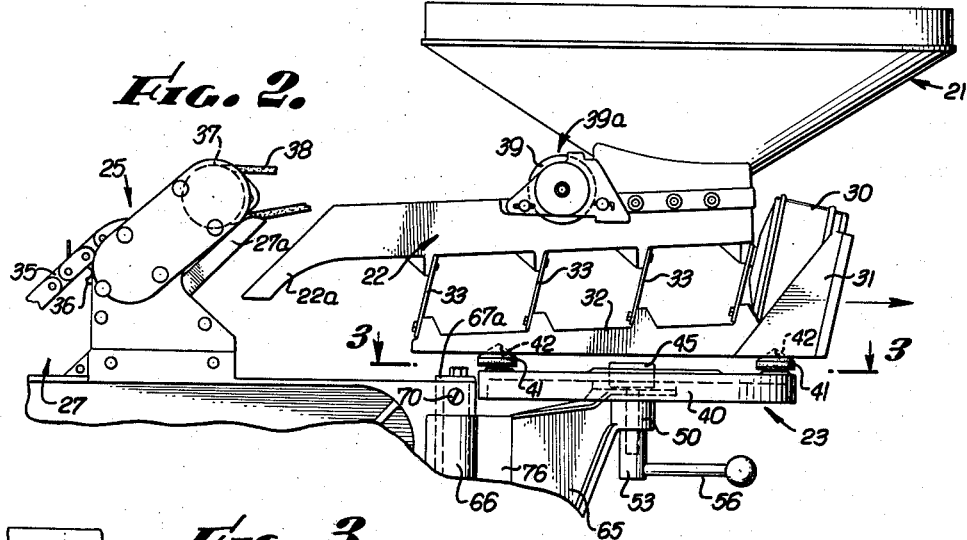
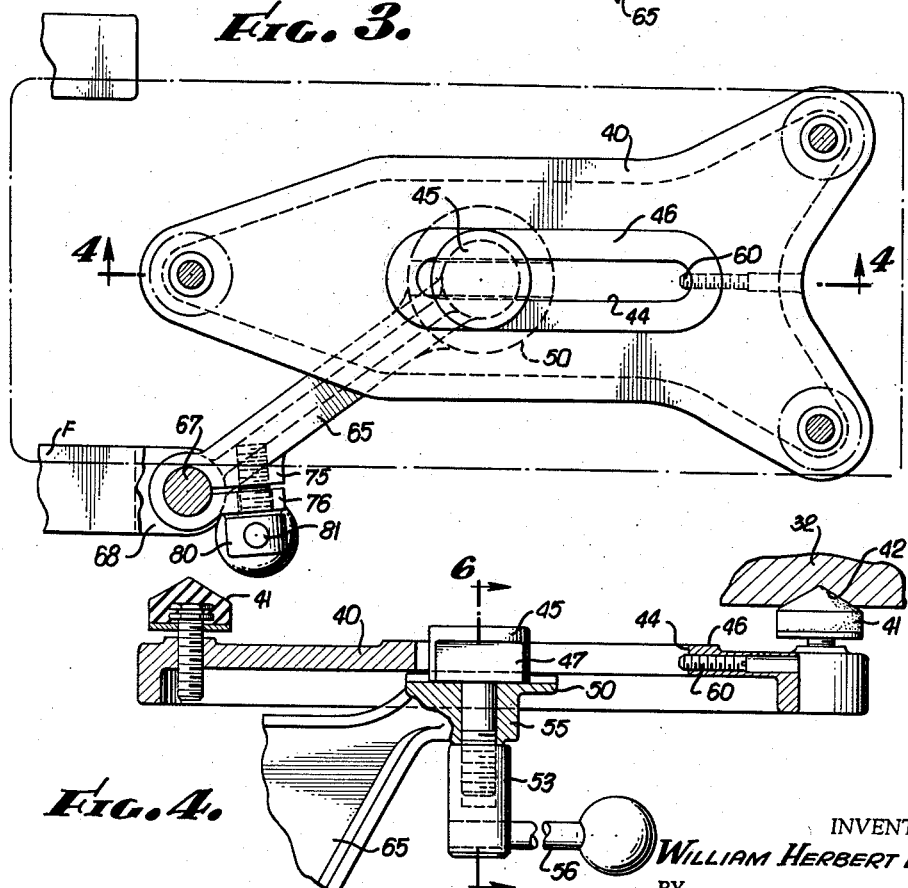
INVENTOR.
WILLIAM HERBERT KAGLEY
BY
Huebner & Worrel
ATTORNEYS.

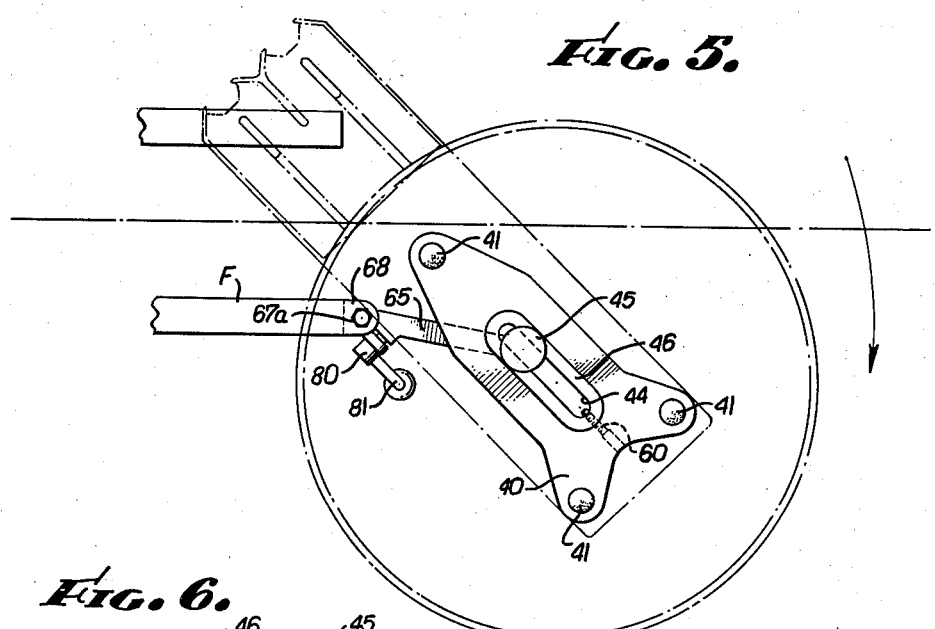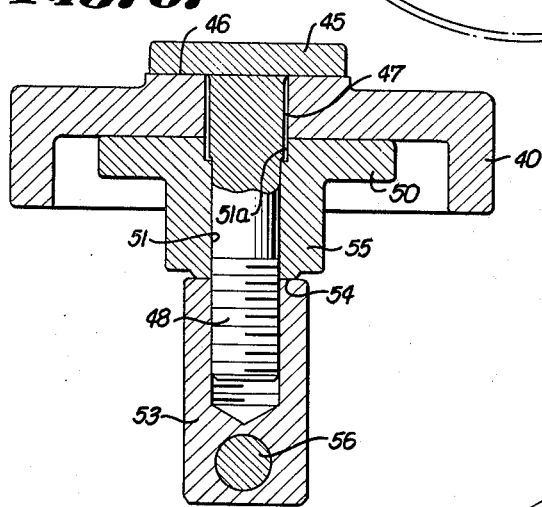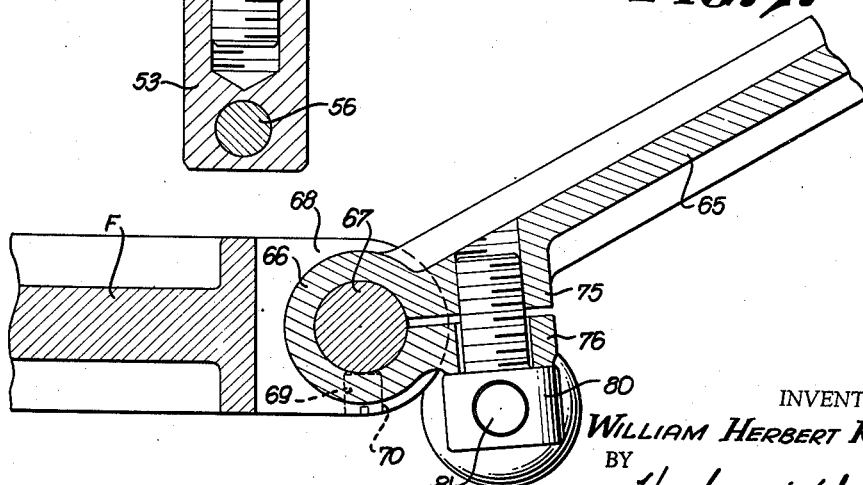

3,191,894
MOUNTING DEVICE FOR VIBRATOR
FEEDING MECHANISM
William H. Kagley, Dinuba, Calif., assignor to Lindsay Ripe Olive Company, Lindsay, Calif., a corporation of California
Filed June 8, 1962, Ser. No. 200,985
4 Claims. (Cl. 248—13)

This invention relates to machinery for segregating and delivering individual piece articles from a bulk supply and it has particular utility in conjunction with or as a part of a fruit pitting machine.

It is most conveniently described with reference to a specific item being handled and for that reason and because of its special adaptability for the purpose it will be described in conjunction with an olive pitting machine, although it is not intended that this reference to an olive pitting machine should restrict the invention which obviously is applicable to other purposes.

In the automatic pitting of olives, which have been chosen as the example of articles handled by the machine, olives in bulk are delivered to a hopper which latter discharges the olives into a slightly inclined tray, the hopper and tray being subjected to rapid vibration, and the combination of the hopper and tray being generally referred to as a feeding device. From this feeding device olives are delivered through discharge passages into a metering device, thence into an aligning chute wherein a spacing and positioning mechanism seizes the olives and presents them between axially aligned dies and punches with the long axes of the olives coincident with the axes of the complementary dies and punches, the latter elements effecting the actual removal of the pits from the olives. Such a machine is shown, for example, in U.S. Patent No. 2,246,843, granted on the application of Edward P. Drake, June 24, 1941. A further embodiment is shown in U.S. Patent No. 2,314,484, granted March 23, 1943, on an application of Drake, Alberty and Kagley (Kagley being the inventor in the present application).

These and other patents on such equipment with which the present applicant is familiar, disclosed the vibrator feeding device mounted through the agency of springs upon a portion of the stationary main frame of the machine. The feeding device needs frequent cleaning which is not conveniently accomplished in situ as some portions are almost inaccessible when the device is in place. Moreover, as this feeding device is located above some of the moving parts of the machine as a whole, in order to avoid contamination of such parts by a spillover from a cleaning operation the removal of the feeding device is called for entirely apart from repair or maintenance service required from time to time. The assembly to be removed is heavy, and removal is cumbersome.

An object of the present invention is to overcome the inefficiency and inconvenience of having to physically lift the vibratory feeding device off its amounts and bodily carry it to one side, by providing a shiftable mounting for this feeding device.

A further object of the invention is to provide a shiftable mounting of the character described by which the vibratory feeding device may be securely held in position during operation of the pitting machine but may be conveniently slid back away from its associated mechanism and then swung transversely to one side of the machine.

A more specific object of the invention is to provide a special shiftable mounting of the character described which comprises a mounting plate assembly having telescoping parts for straight linear retraction of the feeding device, and a vertical hinge sustaining the mounting plate assembly on the main frame in a manner to provide for arcuate transverse swinging of the mounting plate assembly away from the side of the main machine structure.

These and additional objects and advantages of the invention will become apparent from an examination of the drawings and consideration of the description hereinafter contained.

The embodiment of the invention as here illustrated comprises in general, in conjunction with a machine frame, yoke extensions on the frame which mount a vertical post, a bracket releasably clamped on the post which when freed of the clamping force may be horizontally pivoted on the post from a machine operating position to a cleaning and servicing position removed from the operating position, a base plate carried by the bracket which in turn telescopically supports a mounting plate in a manner whereby the latter may be linearly slid into and away from operating position, a clamping means being provided to function between the base plate and the mounting plate to releasably secure the plates together, the mounting plate being provided with cushioning pads for the feeding device to rest upon.

In the drawings:

FIGURE 2 is a view similar to FIGURE 1 showing the mounting device in a linearly retracted position.

FIGURE 3 is a horizontal section taken on the line 3—3 of FIGURE 2 and illustrating in somewhat enlarged form the mounting device.

FIGURE 4 is a vertical section of the same device taken on line 4—4 of FIGURE 3.

FIGURE 5 is a fragmentary view taken on line 3—3 of FIGURE 2, but showing the mounting device and the feeding mechanism which it supports retracted and swung to one side.

FIGURE 6 is an enlarged fragmentary vertical section taken on line 6—6 of FIGURE 4.

FIGURE 7 is an enlarged fragmentary horizontal section taken on the line 7—7 of FIGURE 1.

Figure 1:
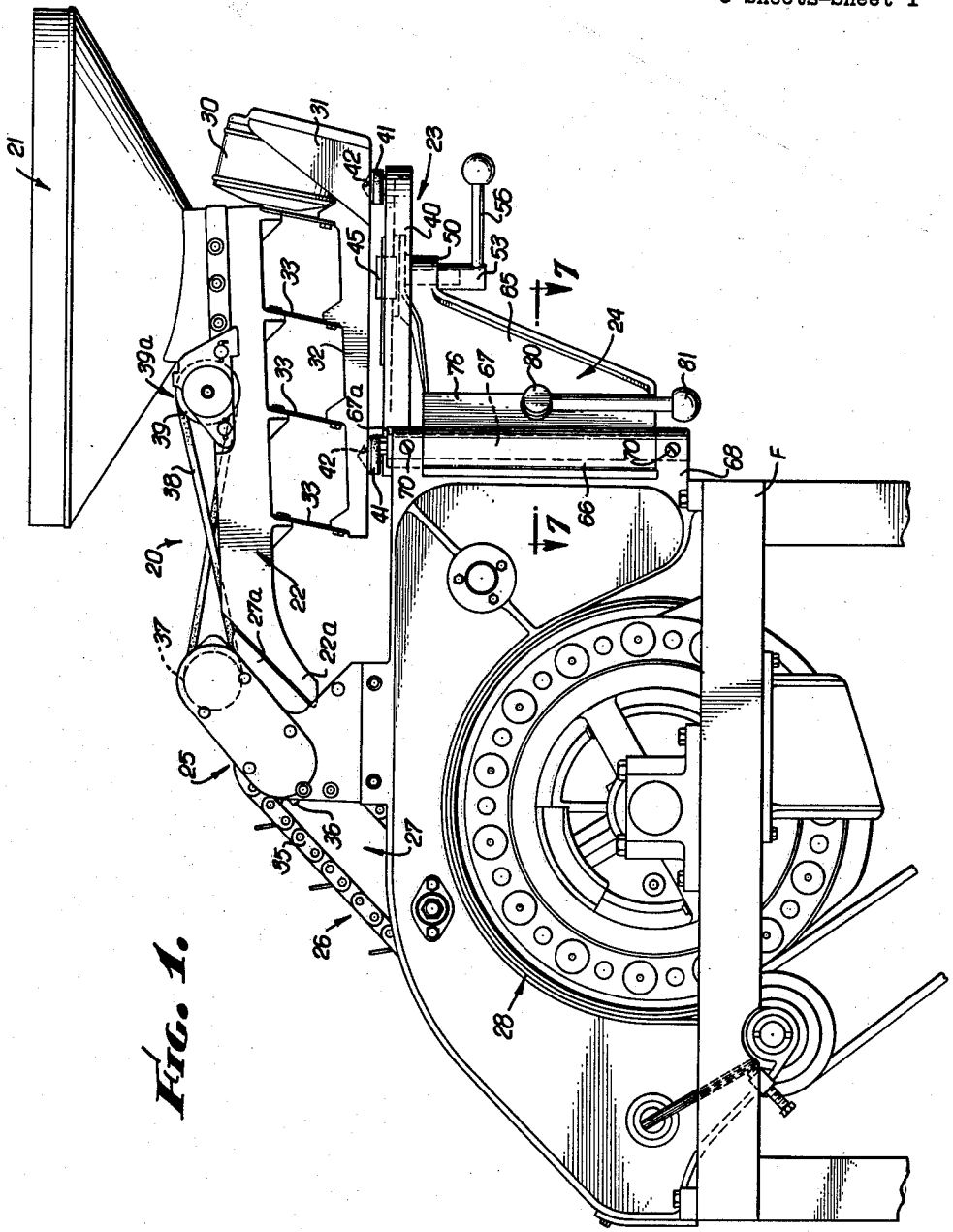
FIGURE 1 is a side elevation of the mounting device in operating position, shown in association with some of the parts of an olive pitting machine.

The vibratory feeding device heretofore mentioned is generally designated 20, this including a hopper 21, and a tray 22. These parts are supported on a mounting plate and base plate assembly 23 which in turn is sustained by a vertical pivot bracket assembly 24 on main frame F. This main frame carries in cooperative working relationship with the vibratory feeding mechanism a metering device 25, a spacing and positioning mechanism 26, an aligning chute 27, and a punch and die mechanism 28, which may be of a nature disclosed in more detail in the prior patents referred to.

The hopper is securely mounted upon the tray 22, which latter feeds olives from bulk in the hopper into passages (not shown) in the tray, and from the tray 22 the olives are delivered into the metering device which latter is physically and operatively intimately associated with the aligning chute, an inclined portion 27a of the latter being in immediate overlying juxtaposition to a forward inclined tip 22a of the tray 22.

Any suitable vibratory motor 30 mounted on a bracket 31 of a seat 32 imparts rapid vibratory motion to the tray and hopper. The vibrating tray is carried by a plurality of supporting webs 33 secured to the seat 32 which are stiff enough to sustain the assembly of vibrating tray and hopper but are sufficiently flexible to dampen vibration which tends to be transmitted back into the main frame of the machine.

Through a prime mover (not shown) usually in the form of an electric motor, an endless chain 35, which functions as a part of the spacing and positioning mechanism, travels over an upper sprocket 36, and the rotation of the sprocket is transmitted by a belt or chain (not shown) to a pulley 37. This pulley imparts drive to a belt 38 which rotates a pulley 39 and thus a roller 39a which is revolvably mounted in conjunction with the hopper and vibrating tray. Details and function of a roller of this type are shown and described in Patent No. 2,314,484 previously referred to and need not be repeated here. Such roller is primarily for the purpose of backing up olives in the hopper to prevent congestion in the delivery of olives from the hopper into the tray. One reason for showing it here is to indicate that the belt 38 is readily removable from the pulley 39 which is associated with the roller 39a. If the belt is sufficiently elastic it need not be removed when the vibratory feeding mechanism is swung back and out of line, but should the belt resist that movement it can be slipped off.

With the foregoing environmental description which is deemed essential to an understanding of the features of novelty sought to be patented by the present application, we will next turn to the improvement which is the crux of the present invention.

The plate assembly 23 includes a mounting plate 40 which is roughly spearheaded in outline and which carries three triangularly spaced rubber or rubber-like pads 41, the latter being cone shaped and adapted to be received in complementary sockets 42 in the bottom of the vibrating seat 32. The mounting plate 40 is formed with a longitudinally elongated slot 44 extending centrally along the major axis of the plate, for the reception of a clamping bolt 45. This slot 44 is bounded by an elevated face 46.

The shank of the bolt 45 includes a flattened section 47 adjacent the head thereof and the shank is cylindrical and threaded as at 48 at its end region opposite the head. The flattened section 47 reposes within the slot 44 which restrains the bolt against rotation.

The mounting plate 40 rests upon a base plate 50 which is a part of the pivotal bracket mechanism heretofore referred to and designated by the reference numeral 24. The shank of the bolt 45 passes through a bore 51 in the base plate and extends therebelow. The bore 51 has a major cylindrical portion where the cylindrical cross section of the bolt shank extends, but it also has a flattened section 51a which is a vertical projection of the slot 44; and the flattened portion 47 of the bolt is of sufficient length to extend down into the flattened portion of 51a of the bore 51 and thus keys the plates 40 and 50 against relative rotation when a nut is tightened or loosened on the bolt.

A clamping nut 53 is associated with the bolt 45 and is adapted to bear against a clamping face 54 provided at the lower end of a boss 55 of the base plate. A handle 56 is mounted in the nut 54 whereby the nut may be tightened or loosened. When it is tightened the bolt 45 clamps the mounting plate and the base plate together in a fixed and relatively stationary relationship. When the bolt is loosened the mounting plate may be telescoped relative to the base plate to the limits provided by the length of the slot 44. If desired, an adjusting set screw 60 may be utilized for a fine adjustment of the effective terminal of the slot. Such may be desirable for accurate positioning of the tip 22a of the vibrating tray 22 in proximity to the element 27a of the aligning chute.

The pivotal supporting bracket assembly generally designated 24 and which embodies at its upper outer extremity the base plate 50 which has been described, comprises also a vertical web 65 formed with an elongated vertical split sleeve 66 which latter encompasses a vertical mounting post 67. The latter is nonrotatably secured in a yoke 68 formed on the frame F. It is formed with a head 67a resting on the upper leg of the yoke. Suitable bores 69 are formed in the extremities of the yoke, and horizontal pins (or set screws) 70 serve to set the post in the yoke against rotation.

The web 65 is formed with a boss 75 adjacent one side of the split in collar 66 and such collar is provided with a complementary boss 76 on the other side of the split. In the absence of clamping tension on the bosses the web 65 may be arcuately rotated on the post 67. A machine bolt 80 with a handle 81 may be turned to clamp the bosses together, whereby the web 65 is restrained against swinging movement.

The location of the yoke 68 is preferably at an outer margin of the frame F whereby the angle of the web 65 in machine operating postion is generally oblique to the vertical plane of the side of the frame, and when the mounting plate 40 is rotated out of normal operating position the assembly which it supports can be swung to one side of the main frame and generally removed from the plane of that frame.

We will now briefly summarize the operation which should be clear from the foregoing description. Assume that the parts are in the position shown in FIGURE 1 for normal operation of the pitting machine. At this time the handle 56 of the nut 53 and the handle 81 of the machine screw 80 are turned tight. If it is desired to shift the vibratory feeding device into a removed position for cleaning or other service the customary sequence (after removing the belt 38 if that be necessary) is to first loosen the clamping nut 53 and slide the mounting plate 40 rearwardly. This carries the feeding device with it. It will be noted that sliding the feeding device rearwardly removes the forward inclined tip 22a of the vibrating tray from its contiguity with the upper end 27a of the aligning chute and metering device assembly. The next step customarily is to loosen the clamping machine screw 80 by turning the handle 81 which frees the collar 66 from its clamped relationship upon the post 67, and thereupon the web 65 with its associated parts is swung outwardly in an arc to the position shown in FIGURE 5 or farther if desired.

These operations are performed in the reverse order when the feeding device is to be restored to its normal operating position in the pitting machine. Cleaning and servicing operations can be performed upon the feeding device while it remains mounted on the plate assembly 23 as positioned away from the main frame. If, however, circumstances require removal of the feeding device from the plate assembly, the belt 38 must be slipped off (if not previously removed) and the feeding mechanism may then be conveniently hoisted off of the supporting pads 41 in a direct and simple vertical lift. There is no necessity, as in the past, for tilting the feeding assembly in getting it completely off of its mounts in order for the forward end of the vibrating tray to clear the upper portion of the aligning chute and metering mechanism because the shifting rearwardly and transversely of the feeding device affords complete vertical as well as lateral separation of the parts which might otherwise interfere in removing the feeding device.

While I have herein shown and described the invention in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

In order to readily comprehend the terms used in the claims, some of which may not find a specific antecedent in the foregoing description, the following summary is included here, which is by way of example and not of limitation.

In claim 1, the "article receiving device" referred to in the introductory section, comprises the metering device 25 and associated aligning chute 27 with its upper portion 27a.

The "elongated article directing means" overlying the frame comprises the vibratory feeding device 20 and the mounting plate 40 on which it is lodged in a fixed horizontal orientation.

The "support having guide means thereon" for guiding the directing means comprises the necessary elements of the bracket assembly 24, construed to embody the base plate 50.

The "clamp means for selectively clamping" the delivery means to the support in a selected position on the support comprises the bolt 45 and nut 53.

The "means for locking" the bracket against pivoting movement comprises the bosses 75 and 76 and bolt 80.

With the foregoing identification in mind, the more specific recitations in the dependent claims will be obvious.

What I claim is:

1. In a machine for processing successive food articles having a frame and an article receiving device thereon having an entry portion; elongated article directing means overlying said frame and having an article delivery end arranged in substantially mating relation to said entry portion; a support having guide means thereon for guiding said directing means in substantially rectilinear movement toward and from said article receiving device and maintaining said directing means in a fixed direction of orientation relative to said frame; clamp means for selectively clamping said delivery means to said support in a selected position on said support; said support being a portion of a bracket pivotally mounted on said frame about a vertical axis spaced from said support whereby said delivery means may be rectilinearly retracted from said receiving device then pivoted about said axis laterally to a position outwardly of a side of said frame; and means for locking said bracket against pivoting movement about said axis.

2. In a machine as defined in claim 1 wherein said directing means includes a plate having an elongated slot; said guide means comprising a clamping element slidably engaging in said slot and non-rotatably engaging said support; said clamp means comprising means on said clamping element for clamping said plate against said support.

3. In a machine as defined in claim 2 wherein said clamping element comprises a bolt having a head overlying said plate and a flat shank portion in said slot and nut means for drawing said bolt and head toward said support.

4. In a machine as defined in claim 3 wherein said support is provided with a groove, said flat shank portion extending into said groove and being held thereby against rotation.

References Cited by the Examiner

UNITED STATES PATENTS

| | | | |
|---|---|---|---|
| 1,832,938 | 11/31 | Leach | 158—8 |
| 2,314,484 | 3/43 | Drake | 198—30 |
| 2,349,197 | 5/44 | Rehfeld | 248—16 X |
| 2,456,959 | 12/48 | La Mont | 248—23 |
| 2,679,992 | 6/54 | Schuette | 248—23 |
| 2,804,289 | 8/57 | Schmaneke | 248—22 X |

FRANK L. ABBOTT, *Primary Examiner.*